G. W. HOOKER.
Sled-Brakes.
No. 209,398.    Patented Oct. 29, 1878.
Fig: 1.
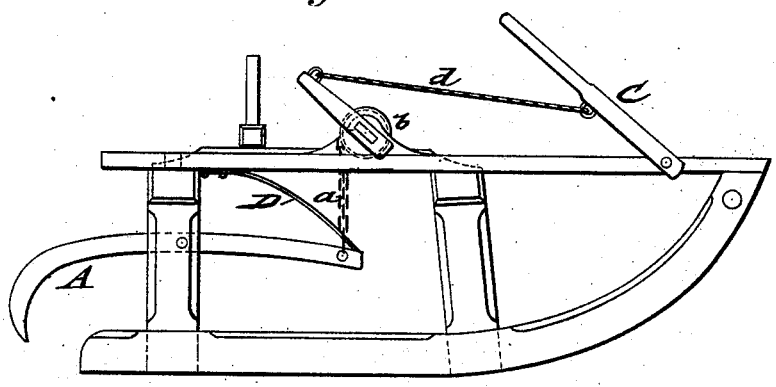
Fig: 2.
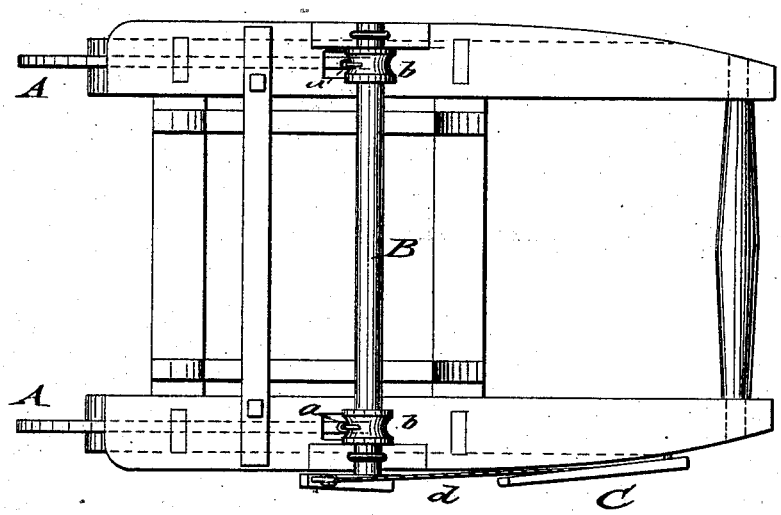
Fig: 3.
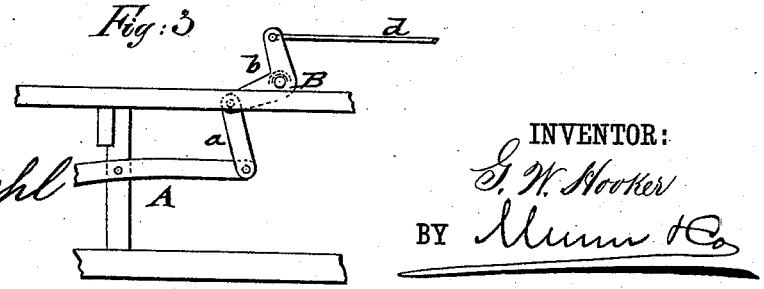
WITNESSES:
Achilles Schehl
C. Sedgwick
INVENTOR:
G. W. Hooker
BY Munn & Co
ATTORNEYS.

UNITED STATES PATENT OFFICE.

GEORGE W. HOOKER, OF GRAND RAPIDS, MICHIGAN.

IMPROVEMENT IN SLED-BRAKES.

Specification forming part of Letters Patent No. 209,398, dated October 29, 1878; application filed May 18, 1878.

*To all whom it may concern:*

Be it known that I, GEORGE W. HOOKER, of Grand Rapids, in the county of Kent and State of Michigan, have invented a new and Improved Sleigh-Brake, of which the following is a specification:

In the accompanying drawing, Figure 1 represents a side elevation, and Fig. 2 a top view, of my improved sleigh-brake; and Fig. 3, a side view of a modified construction of the same.

Similar letters of reference indicate corresponding parts.

This invention relates to an improved sleigh-brake by which the sleigh may be fully controlled, as the brake is readily applied to the ground and taken off as required; and the invention consists of fulcrumed dogs that are operated by a crank-shaft and hand-lever arrangement, so as to take hold of the ground or be raised again therefrom.

Referring to the drawing, A represents iron dogs that are fulcrumed to the sleigh-knees, and connected at their front ends by chains $a$ to rollers $b$ of a crank-shaft, B, that turns in bearings of the sleigh. The chains are rigidly attached to the rollers, so as to be wound up on the same in turning the crank-shaft.

In place of the chains and rollers, connecting pivot-links $a$ and bell-cranks $b$ may be used, as shown in Fig. 3.

One of the cranks of the crank-shaft B is connected by a chain, rope, or crank-rod, $d$, with a pivoted hand-lever, C, at the front part of the sleigh.

The forward motion of the hand-lever turns the crank-shaft and winds up the chains or lifts the bell-cranks, so as to raise the front ends and lower the rear ends of the dogs.

When chains and rollers are used band-springs D are employed that press on the front ends of the dogs, so as to raise the same from the ground as soon as the hand-lever is released.

When bell-cranks and connecting-links are used the backward motion of the hand-lever interrupts the brake action of the dogs. In this manner the brake is applied by the forward motion of the hand-lever and intermediate mechanism, and taken off, when not required, by relinquishing the pressure on the hand-lever or throwing the same in backward direction.

Having thus described my invention, I claim as new and desire to secure by Letters Patent—

The dogs A, pivoted to knees of the sled, having curved ends projecting behind it and operated by springs and lift mechanism connected with their rear ends, as shown and described.

GEORGE W. HOOKER.

Witnesses:
HIRAM M. PIERCE,
JOHN C. FITZGERALD.